United States Patent
Holling

[11] 3,739,516
[45] June 19, 1973

[54] LINE CONTROLLABLE BOAT
[76] Inventor: John H. Holling, 416 Grove Avenue, Ukiah, Calif. 95482
[22] Filed: Nov. 3, 1971
[21] Appl. No.: 195,241

[52] U.S. Cl. .................................... 43/26.1, 46/93
[51] Int. Cl. ........................................... A01k 89/00
[58] Field of Search ....................... 43/26.1, 3, 6.5; 46/93

[56] References Cited
UNITED STATES PATENTS
3,203,131  8/1965  Myers ................................ 46/93 X
2,984,974  5/1961  Bell .................................... 46/93 X
1,850,296  3/1932  Vermeulen ......................... 43/26.1

Primary Examiner—Louis G. Mancene
Attorney—Edward Brosler

[57] ABSTRACT

A toy size boat having a rudder remotely controllable by means of a line and adapted for use in carrying a baited fish line to remote locations from shore or for trolling purposes.

9 Claims, 16 Drawing Figures

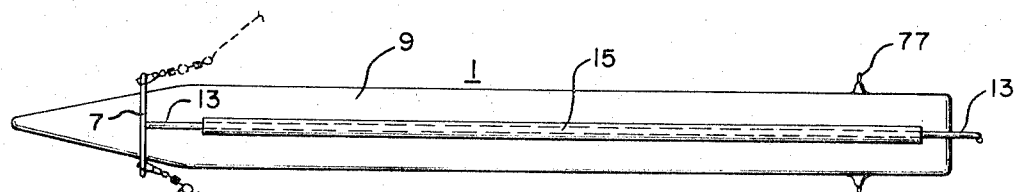
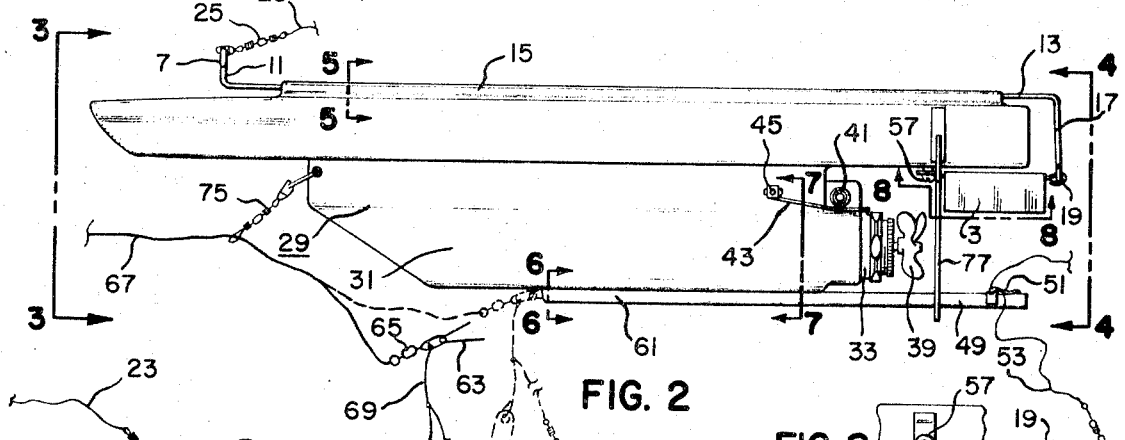
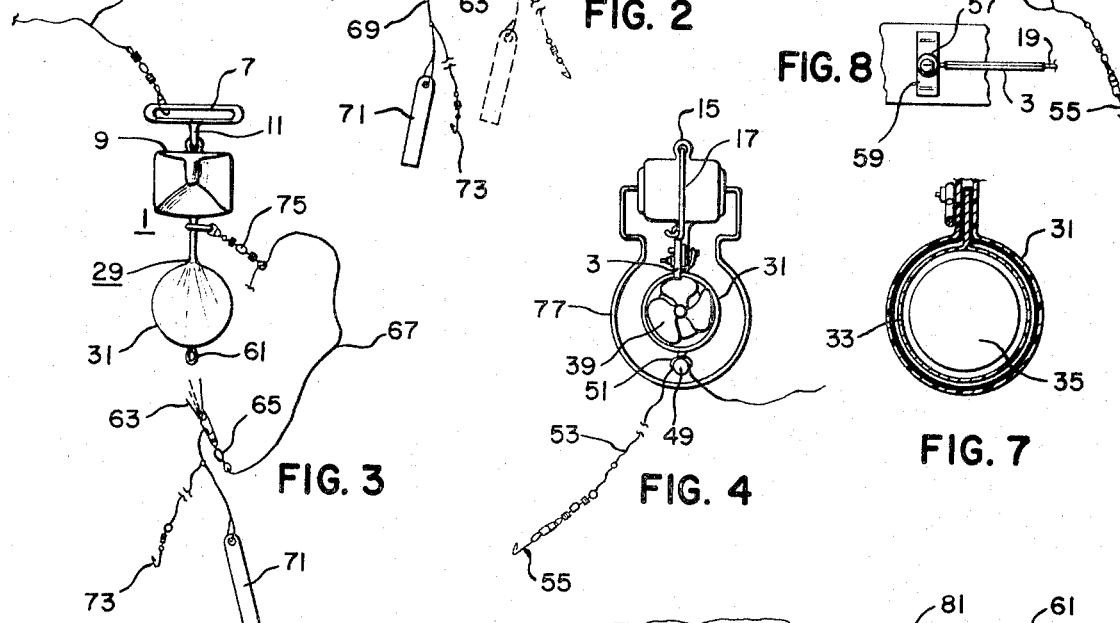
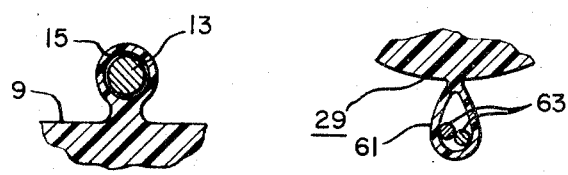
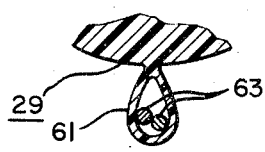
INVENTOR
JOHN H. HOLLING
BY
Edward Brosler
ATTORNEY

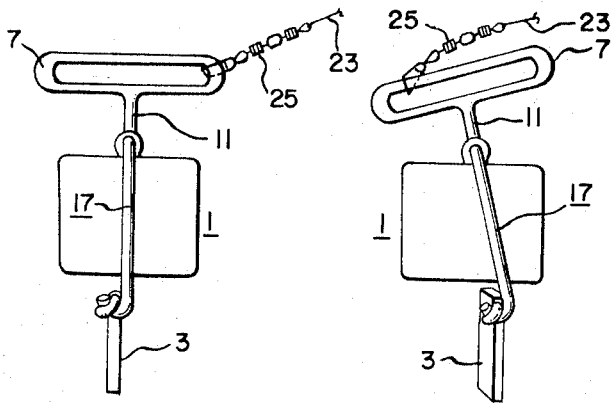
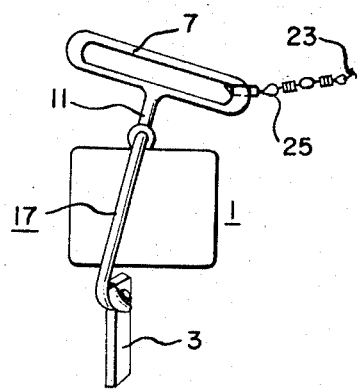
FIG. 10  FIG. 11  FIG. 12
FIG. 10A  FIG. 11A  FIG. 12A
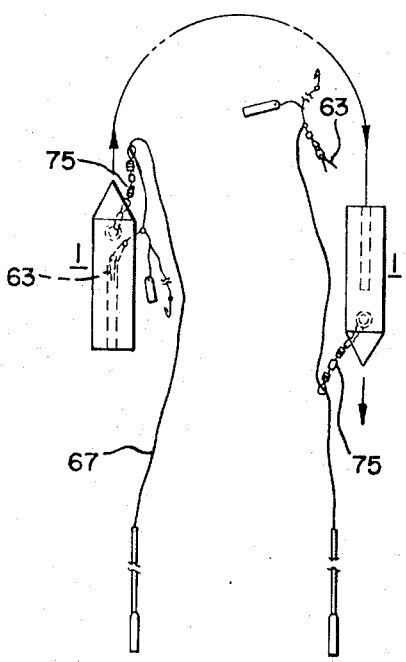
FIG. 13
INVENTOR.
JOHN H. HOLLING
BY Edward Brosler
ATTORNEY

LINE CONTROLLABLE BOAT

My invention relates primarily to the field of fishing equipment and more particularly to a small toy size line controllable boat which may be adapted for use as a fishing accessory.

The device of the present invention, when employed for fishing, is for use primarily by individuals fishing from shore.

When fishing from shore, the distance at which a baited hook is dropped is normally determined by the casting ability of the fisherman, and this of course limits him to distance.

As for trolling, this always, heretofore, required the use of passenger craft, and was not available to individuals fishing from shore.

Among the objects of my invention are;

1. To provide a novel and improved line controllable boat;
2. To provide a novel and improved line controllable boat adaptable for use as a fishing accessory;
3. To provide a novel and improved line controllable boat which will eliminate the need for casting a baited hook from shore, and which will enable the dropping of a baited hook at unlimited distances;
4. To provide a novel and improved line controllable boat which will enable a fisherman on shore to troll;
5. To provide a novel and improved line controllable boat which may be used as a toy.

Additional objects of my invention will be brought out in the following description of a preferred embodiment of the same, taken in conjunction with the accompanying drawings where FIG. 1 is a plan view of a line controllable boat of the present invention;

FIG. 2 is a side view in elevation of the boat of FIG. 1;

FIG. 3 is a front view in elevation of the boat of FIG. 2;

FIG. 4 is a rear view in elevation of the boat of FIG. 2;

FIG. 5 is a fragmentary view in section taken in the plane 5—5 of FIG. 2;

FIG. 6 is a fragmentary view in section taken in the plane 6—6 of FIG. 2;

FIG. 7 is a fragmentary view in section taken in the plane 7—7 of FIG. 2;

FIG. 8 is a view taken in the plane 8—8 of FIG. 2;

FIG. 9 is a view depicting an attachment for use with the boat of FIG. 2;

FIGS. 10 and 10A are related views of the steering mechanism of the boat of FIG. 2 as set for forward travel;

FIGS. 11 and 11A are related views depicting the steering mechanism in a position for establishing travel in a circular path to the right;

FIGS. 12 and 12A are related views diepicting the sterring mechanism as set for establishing movement of the boat in a circular path to the left, and FIG. 13 is a schematic view depicting the manner of reversing travel of the boat through remote line control.

Referring to the drawings for details of my invention in its preferred form, the boat comprises a hull 1 supporting below its rear end, a rudder 3 which is pivotally secured to the underside of the hull for horizontal angular movement about a point on the longitudinal axis of the hull.

The rudder is adapted for remote adjustment by line and for this purpose, the rudder extends beyond the rear end of the hull for attachment of the control mechanism.

Such control mechanism comprises an arm 7 pivotally supported above the plane of the deck 9 of the hull and transversely thereof, for tilting movement on an axis paralleling the longitudinal axis of the hull, such transverse arm being coupled to the rudder in such a manner as to shift the rudder in a horizontal plane to the right in response to a tilting of the arm downwardly to the left, and conversely, shifting the rudder in a horizontal plane to the left in response to a tilting of the arm downwardly to the right.

More specifically, the transverse arm may be in the form of a shallow loop supported above the deck of the boat toward the forward end thereof, by a stem 11 which connects with a horizontal rod 13 running preferably along the longitudinal axis of the deck, where it is pivotally installed by running it through a tube 15 affixed to the deck along the longitudinal axis thereof. The rear end of this rod extends slightly beyond the rear end of the hull at which point it takes a downward right angle bend to create a lever arm 17, which, at its free end, is connected through an eye hook 19 embedded in the exposed end of the rudder.

Thus, in response to tilting of the transverse loop 7, the rudder will be caused to swing in a horizontal plane. In this connection, it is important to note that with a downward tilt of the transverse loop to the left, the rudder will swing in a horizontal plane toward the right, and conversely tilt of the transverse loop to the right, the rudder will be caused to swing to the left.

To complete the control mechanism for the rudder, a control line 23 is slidably connected to the upper side of the loop, as by a conventional swivel 25, and to preclude such swivel from sliding around to the under side of the loop, the ends of the loop may be either filled in or swaged, as it is important that the swivel remain slidably connected to the upper side of the loop at all times.

The hull includes a keel 29, the lower portion of which is expanded to form a cylindrical housing 31, closed at its forward end but open at its rear end to receive a sealed power unit 33 which may include one or more dry cell batteries 35 and a simplified motor (not illustrated) which is drive connected to an exposed propeller 39, the dry cell batteries being connected to the motor through a small switch 41 located above and included as a part of the sealed unit.

The seal power unit is retained in its installed position in the cylindrical compartment of the keel by a U-shape piece of wire 43 straddling the upwardly extending switch portion of the seal unit and removably anchored to the keel by a bolt 45 passing through looped ends of the wire.

The boat as thus described, is capable of being remotely controlled through the line 25 connected to the transverse loop 7. With the motor energized and the propeller spinning, the boat is released in the water, where it will proceed on a course determined by the position of the rudder.

At some point in its travel, a tug on the line will cause the transverse loop to tilt downwardly in the direction of the tug, and this will set the propeller for travel in a wide circle in a direction away from shore, either to the right or to the left depending on the attitude of the boat when the line was tugged. Such wide circular sweep will result only in the event the line is then relaxed.

If tension is maintained on the line, whereby the boat will be restrained from following the circular path of travel dictated by the position of the rudder, the boat may be made to travel a path substantially parallel to the shore line.

Should the boat be permitted to travel a circular path, then at any point in its travel when the high end of the tilted loop happens to be directed toward shore, a tug on the line will swing the rudder to its opposite extreme position and cause the boat to initiate a circular path of travel in the opposite direction.

With the boat thus remotely controllable as to movement, the boat becomes idealy suited for trolling purposes.

With this in view, a rod 49 affixed longitudinally to the lower edge of the keel and extending rearwardly beyond the propeller, carries at its free end, a spring clip 51 whereby to removably secure a line 53 intended for trolling. Inasmuch as movements of the boat may be controlled, the boat may be caused to travel along any course desired, while trailing baited hooks 55 behind it. A fish in taking the baited hook, will automatically disengage the line from the spring clip, thus leaving the fish free to be hauled in, independently of the boat which is then free to proceed on its own way.

In lieu of trolling, one may desire to fish in the conventional manner from shore by depositing the baited hook at a fixed location. The boat of the present invention is adaptable for this purpose, and without placing any limitation as to distance from shore that the baited hook may be deposited.

In this connection, the rudder control mechanism may be dispensed with, and the rudder fixed for a straight ahead course, by tightening of the pivot connection of the rudder to the hull with the rudder symmetrical with the hull.

This may be accomplished by utilizing a screw 57 as a pivot for the rudder and installing between the head of the screw and the hull, a leaf spring 59 which is part of the rudder and against which the screw may be tightened to immobilize the rudder in its desired position.

In conjunction with this, a tube 61 is affixed along the edge of the keel, adapted to receive the free ends of a hairpin type clip 63. This hairpin type clip is passed through a loop or opening in the swivel 65 at the end of a fishing line 67 and to which the leader 69 for the sinker 71 and baited hook 73 is attached, and by inserting the clip into the tube, the baited hook and the sinker are removably carried by the boat.

Thus, as the boat departs from shore on a straight course, it carries the sinker and baited hook as far as the fisherman on shore desires, whereupon, upon giving the line 67 a sudden tug, the boat will reverse and the hairpin clip will be pulled from its anchorage to free the baited end of the line and permit it to settle.

The boat, now being headed in the general direction of the shore line, will continue toward shore.

However, to assure that the boat will return to its point of launching, a ring or swivel 75 is connected to the front end of the keel, and the fishing line is passed through it prior to adding the sinker and baited hook. Being that the line is weighted at its far end, and under control of the fisherman at the shore end, the line will now act as a guide in keeping the boat on a straight and narrow course toward its point of launching.

In either of the foregoing manners of operation of the boat, entanglement of the line with the propeller, in the absence of any precautionary measures, becomes a distinct possibility.

To avoid such a contingency, a line guard in the form of a stiff loop 77 of wire extending down from the hull behind the propeller and encircling the trolling rod 49, will function to keep the line from becoming snagged in the propeller, and the function of the wire loop as a line guard, may be enhanced by pivoting each end of the loop at its anchor point on the hull.

As an additional feature of the invention, a fisherman may desire to carry a number of fishing lines, and if he does not desire to do this for his own use, he could thereby accommodate his friends.

For this purpose, there is provided a corrugated piece of wire 81 terminating at one end in a reverse bend or hook 83, the hook to be inserted into the same tube as the hairpin clip previously referred to. The exposed corrugaetd portion of the wire, which follows closely along the lower edge of the tube 61 can be used to resiliently support two or three or more additional lines, which may be released,one at a time by pulling on each line in succession when it is desired to drop the sinker.

In lieu of inserting the hook 83 into the same opening as the hairpin type clip 63,the tube 61 may be sectionalized and the hook inserted into a section following that in which the clip 63 may be inserted.

From the foregoing description of my invention in its preferred form, it will be apparent that the same is subject to alteration and modification without departing from the underlying principles involved, and I accordingly do not desire to be limited in my protection to the specific details illustrated and described except as may be necessitated by the appended claims.

I claim:

1. A line controllable boat comprising a hull, a rudder supported by said hull for horizontal angular movement about a point on the longitudinal axis of said hull, an arm to which a line may be slidably connected,- means pivotally supporting said arm above the plane of the deck of said boat and transversely thereof for tilting movement on an axis paralleling the longitudinal axis of said hull, means coupling said pivotal supporting means to a point on said rudder such as to shift said rudder in a horizontal plane to the right with a tilting of said arm downward to the left, and to the left with a tilting of said arm downward to the right, whereby to enable remote steering control with the aid of such line.

2. A line controllable boat in accordance with claim 1, characterized by said means for pivotally supporting said transverse arm including a rod rotatably affixed to the deck of said boat, longitudinally thereof,and having an end turned upward and supporting said arm, whereby said transverse arm may be tilted to the right and to the left.

3. A line controllable boat in accordance with claim 1, characterized by said means for pivotally supporting said transverse arm including a rod rotatably affixed to the deck of said boat, longitudinally thereof and having an end turned upward and supporting said arm, whereby said transverse arm may be tilted to the right and to the left, and further characterized by said arm comprising a very shallow loop.

4. A line controllable boat in accordance with claim 3, characterized by said means coupling said pivotal supporting means to said rudder including a downward extension at the other end of said rod connecting with said rudder.

5. A line controllable boat in accordance with claim 1, characterized by said hull including a keel in the lower portion thereof, said keel housing a power source for powering said boat and having means for releasably holding a fishing line.

6. A line controllable boat in accordance with claim 5, characterized by said means for powering said boat including a battery operable motor and propeller driven thereby, with said battery driven motor installed in said keel and leaving said propeller exposed, and a guard about said propeller to minimize entagnlement of such line in said propeller.

7. A line controllable boat comprising a hull, said hull including a keel, a rudder supported by said hull, means for setting said rudder symmetrical with said hull to encourage movement of said boat in a straight line, means for powering said boat, means carried by said hull for releasably holding the baited end of a fishing line, and means slidably connecting said boat to said fishing line, whereby upon releasing the baited end of said fishing line, said boat will be guided by said fishing line in the subsequent movement of said boat.

8. A line controllable boat in accordance with claim 7, characterized by said means for releasably holding the baited end of a fishing line being located at the forward end of said hull, whereby in response to a tug on said line to release the same, said boat will be substantially reversed as to position to initiate a return thereof to its starting point, utilizing the fishing line as a guide.

9. A line controllable boat in accordance with claim 6, characterized by said means for releasably holding a fishing line being located at the rear end of said hull for use in trolling, means for setting said rudder symmetrical with said hull to encourage movement of said boat in a straight line, means carried by said hull at the forward end thereof for releasably holding the baited end of a fishing line, and means slidably connecting said boat to said latter fishing line, whereby upon releasing said latter line by a tug thereon, with said rudder set, the boat will reverse its direction of movement and return to its starting position, utilizing said latter fishing line as a guide.

* * * * *